United States Patent [19]

Picchiottino

[11] 4,406,136
[45] Sep. 27, 1983

[54] HEATING INSTALLATION NOTABLY FOR SPACE HEATING AND FOR SANITARY HOT WATER PRODUCTION

[76] Inventor: Andre A. Picchiottino, 7 Chemin des Maraichers, 73100 Tresserve, France

[21] Appl. No.: 270,080

[22] Filed: Jun. 3, 1981

[30] Foreign Application Priority Data

Jun. 4, 1980 [FR] France ............................. 80 12461

[51] Int. Cl.³ ............................................ F25B 27/02
[52] U.S. Cl. .................................. 62/238.6; 126/427; 165/18; 237/2 B
[58] Field of Search ................. 237/2 B, 19, 16, 13, 237/8 C, 8 R; 62/238.6, 324.6; 126/427, 428; 165/18

[56] References Cited

U.S. PATENT DOCUMENTS

| | | | |
|---|---|---|---|
| 4,123,003 | 10/1978 | Winston | 126/427 |
| 4,143,814 | 3/1979 | Hill, Jr. | 126/427 |

FOREIGN PATENT DOCUMENTS

| | | | |
|---|---|---|---|
| 2638834 | 3/1978 | Fed. Rep. of Germany | 126/427 |
| 2839258 | 3/1980 | Fed. Rep. of Germany | 126/427 |
| 2261486 | 2/1974 | France | 237/8 R |
| 2279038 | 6/1974 | France | 237/8 R |
| 2424490 | 4/1978 | France | 237/8 R |

OTHER PUBLICATIONS

Electrical Review, Installation Method, vol. 202, No. 6 Feb. 10, 1978 pp. 39–41.

Primary Examiner—Albert J. Makay
Assistant Examiner—Henry Bennett
Attorney, Agent, or Firm—Beveridge, DeGrandi and Kline

[57] ABSTRACT

Heating installation for generating heat in a heat diffusion system (1) and for producing sanitary hot water stored in a tank (3), comprising at least one heat source (4) and at least one means for storing heat (5), comprising in addition a loop-shaped or ring pipe (8, 9), with this pipe comprising a first portion (8a) across the ends of which a pipe (10) associated thermally with the heat source (4) can be connected in parallel, a second portion (9a) across the ends of which a pipe (11) associated thermally with the heat storage means (5) can be connected in parallel and a third portion (8b) forming, with a sanitary water circulation pipe (12) external to the tank (3), a heat exchanger, with the heat diffusion system (1) being connected in parallel across this third portion (8b) forming the heat exchanger and with a heat pump (15) being installed between the said ring and the sanitary water of the tank (3).

15 Claims, 2 Drawing Figures

HEATING INSTALLATION NOTABLY FOR SPACE HEATING AND FOR SANITARY HOT WATER PRODUCTION

BACKGROUND OF THE INVENTION

This invention relates to a heating installation notably for space heating and for producing sanitary hot water using a preferably natural heat source.

Various installations of this type have already been proposed. However, these known installations possess a complicated structure and require a large number of lines and valves so that their price remains very high. Further, the heat transfers possible are limited.

The purpose of the present invention is to remedy these shortcomings and it proposes a heating installation having a very simple structure although allowing heat exchanges between all the elements making up this installation.

SUMMARY OF THE INVENTION

The heating installation according to the present invention, notably for producing heat in a heat diffusion system, for example for space heating and for producing sanitary hot water stored in a tank, comprises at least one heat source and at least one means for storing heat which can be subsequently given back and uses a heat transfer fluid like water moved round a closed circuit in order to carry out the heat transfers.

The heat source may consist of hot water, a heat pump, a geothermal heat exchanger or any other heat recovery system. But it will preferably consist of solar collectors. The heat storage means may consist of a tank containing a relatively large volume of water, a mass of earth or by any other means capable of holding the heat.

The heating installation according to this invention comprises a pipe forming a ring in which the fluid can flow in one direction and the whole installation is built round this ring or loop.

According to the present invention the said pipe in the form of a ring has a first portion at the ends of which is a by-pass connected pipe enabling the said fluid to be associated thermally with the said heat source in order to circulate the said fluid either in the said first portion or in this by-pass pipe, and a second portion placed in the fluid flow direction in this ring downstream of the said first portion and at the ends of which a shunt or by-pass pipe is connected enabling this fluid to be associated thermally with the said storage means in order to circulate this fluid either in the said first portion or in this associated by-pass pipe.

According to this invention the ring-shaped pipe also comprises a third portion located between the said first and second portions downstream of the second portion and thermally associated with the sanitary water of the tank with the aim of exchanging heat between the fluid flowing in the third portion of the ring and the tank's sanitary water when the said fluid flows in the said third portion. Further, a pipe allowing the said fluid to be associated thermally with the said heat diffusion system is connected to the pipe forming the ring, in parallel or by-passing the said third portion so that the fluid can flow in the said third portion and/or in the said pipe associated with this heat diffusion system.

In a first embodiment version of the heating installation according to this invention, the said third portion of the loop forms, with a sanitary water circulation pipe or circuit external to the said tank, a heat exchanger designed to exchange heat between the fluid flowing in the third portion and the sanitary water when the said fluid flows in the third portion, and the sanitary water in the said circulation pipe or circuit external to the said tank.

According to this invention the heating installation preferably comprises at least one auxiliary heat source associated thermally with the said sanitary water pipe or circuit external to the tank. This auxiliary heat source preferably consists of a heat pump the condenser of which is associated thermally with the sanitary hot water and the evaporator of which is associated thermally with the said fluid via a pipe connected to the said ring firstly between the said second portion of the ring-shaped pipe and the junction between this ring-shaped pipe and the pipe thermally associated with the nearest heat diffusion system and secondly between the other junction between the ring pipe and the pipe associated thermally with the heat diffusion system and the said first portion of the ring-shaped pipe.

A pump is preferably installed on the said sanitary water circuit or pipe external to the tank for moving the water in this pipe with the purpose of exchanging heat between the said fluid and the sanitary water in the heat exchanger.

In a second embodiment version of the installation according to this invention, the said third portion is located inside the tank, so that the heat exchanger in the first version is formed in this version directly by the sanitary hot water tank. Furthermore, a by-pass pipe is connected to the ends of this third portion in order to circulate the fluid either through this by-pass pipe or through the said third portion.

In this second embodiment version, also at least one auxiliary heat source is preferably thermally associated with the sanitary hot water. This auxiliary heat source may also consist of a heat pump the evaporator of which is associated thermally with the said fluid via a pipe connected to the said ring-shaped pipe firstly between the said second portion of the ring-shaped pipe and the junction between this ring-shaped pipe and the pipe associated thermally with the nearest heat diffusion system and secondly between the other junction between the ring-shaped pipe and the pipe associated thermally with the heat diffusion system and the said first portion of the ring-shaped pipe, and the condenser of which is associated thermally with the sanitary water.

In this second embodiment version of the heating installation according to the present invention, the said sanitary hot water tank preferably comprises an internal partition creating two compartments one of which comprises the said third portion and the other of which comprises the heat pump condenser, with the partition permitting back-and-forth movement of the water inside the tank from one compartment to the other. However, it is preferable for the two internal compartments of the said tank to connect at the bottom and top so that the water revolves in the tank.

According to this invention a valve of a type with two flow-directions and three-way operation is preferably fitted at one of the junctions between the said ring-shaped pipe and the said pipe thermally associated with the evaporator of the said heat pump in order to circulate the said fluid either in the said third portion or in this pipe thermally associated with the heat pump evaporator.

According to this invention the branches of the said pipe thermally associated with the evaporator are preferably connected by a direct return line in which a valve is fitted that is controlled by the evaporator temperature or pressure so as to keep this evaporator at a suitable temperature or pressure, with a pump driving the said fluid being located on the said pipe thermally associated with the heat pump evaporator between one of the junctions between this pipe and the direct return pipe and the heat pump evaporator.

According to this invention the said heat diffusion system may consist of elements fitted onto the pipe associated with this system, there being a direct return pipe also connected onto this pipe in parallel to the said system, with a mixing valve being installed at one of the junctions between the said pipe associated with the said system and this direct return pipe, and a pump driving the said fluid being located in the said pipe associated with this system between the junction between the said direct return pipe and the pipe associated with the said system and this system.

According to this invention a pump driving the said fluid is preferably installed in the said loop or ring pipe at a position on this pipe where the fluid is continuously flowing during heat transfers.

According to this invention it is preferable to provide temperature probes to measure more specifically the heat source temperature, the storage means temperature, the fluid temperature just upstream of the said first portion, the fluid temperature just downstream of the said second portion, the temperature at the inlet to the heat diffusion system and the sanitary water temperature in the tank, in order, by means of an automatic electric or electronic device, to control the installation's elements so as to perform the required and possible heat transfers.

BRIEF DESCRIPTION OF THE FIGURES

This invention will be understood better after studying the two embodiment versions or variants of the heating installation according to the present invention described as non-restrictive examples and illustrated schematically by FIGS. 1 and 2.

DETAILED DESCRIPTION

First of all the structure and operation of the heating installation shown in FIG. 1 will be described.

Figure 1:
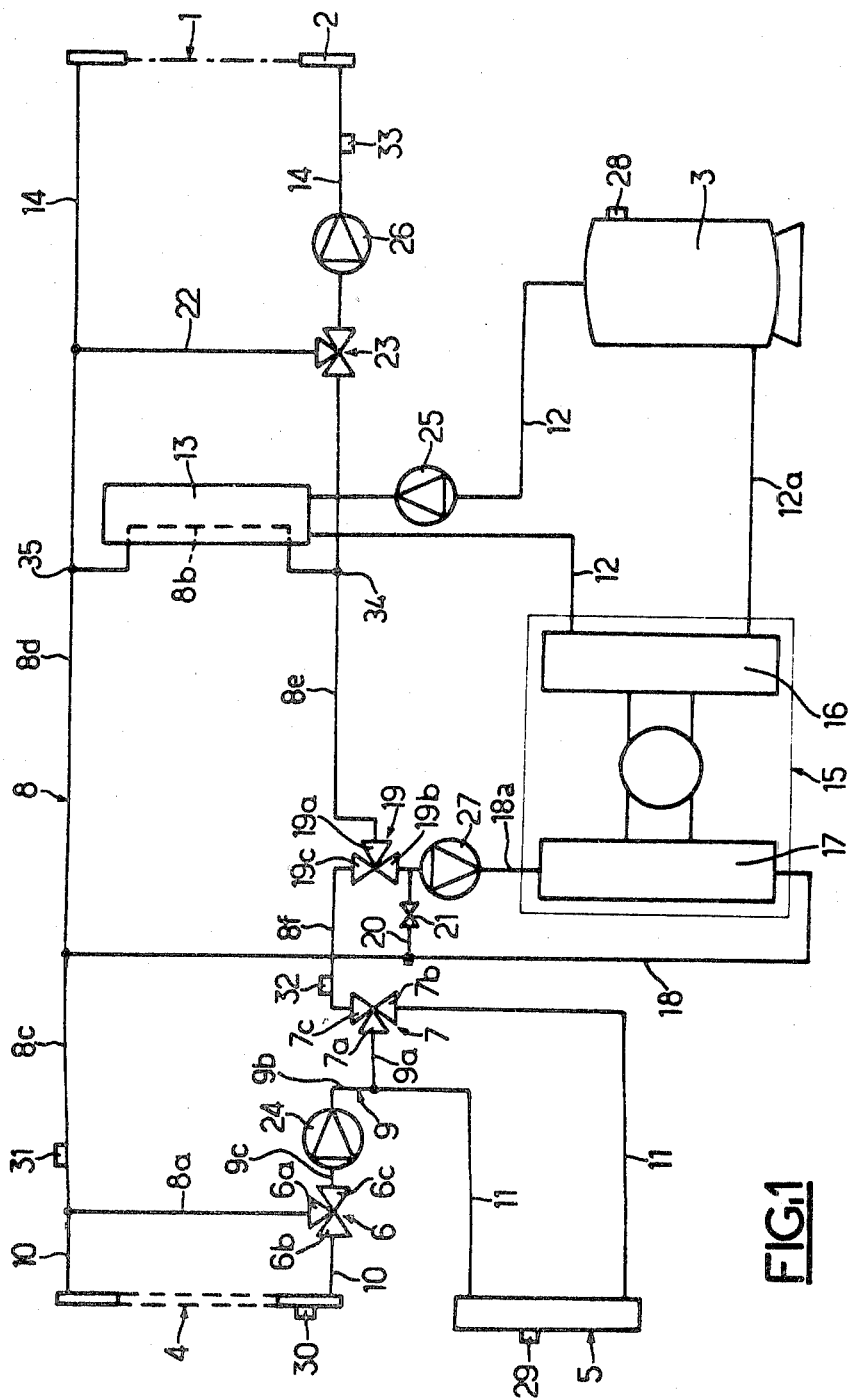

The heating installation shown in FIG. 1 is designed for generating heat in a heat diffusion system marked overall by reference 1 and consisting, for example, of floor panels 2 designed for space heating and for producing sanitary hot water stored in a tank marked by the reference 3. The heat diffusion system could also consist of radiators or other heating elements.

The heating installation comprises a heat source consisting of solar collectors marked overall by the reference 4 and a means for storing heat to be recovered later. This storage means is marked overall by the reference 5 and may be formed conventionally by a water-filled tank or by a volume of earth with pipes passing through it or by a combination of both these methods.

In the example shown in FIG. 1 the heat transfer fluid used consists of water.

The heating installation shown in FIG. 1 comprises a first valve marked overall by the reference 6 and a second valve marked overall by reference 7. These valves 6 and 7 are of the three-way type and comprise two inlets respectively 6a, 6b and 7a, 7b and one outlet 6c and 7c respectively. Outlet 7c of valve 7 is connected to inlet 6a of valve 6 by a pipe forming a first branch marked overall by reference 8. Outlet 6c of valve 6 is connected to inlet 7a of valve 7 by a pipe forming a second branch marked overall by reference 9. Branches 8 and 9, along with valves 6 and 7, enable a loop or ring to be formed.

Branch 8 comprises a section 8a adjacent to valve 6 forming a first portion of the ring formed by branches 8 and 9 across the ends of which pipe 10 is shunt connected, which pipe enables the heat transfer water to be associated thermally with the solar collector 4. This pipe 10 is also connected to branch 8 at the end of its section 8a on the one hand and to inlet 6b of valve 6 on the other. This pipe 10 may be made up of several sections depending on the assembly of the solar collectors 4.

Branch 9 comprises a section 9a adjacent to valve 7 and forming a second portion of the ring formed by branches 8 and 9 across the ends of which a pipe 11 is connected which allows the heat transfer water to be associated thermally with the storage means 5. This pipe 9a is connected firstly on branch 9 at the end of its section 9a and secondly to inlet 7b of valve 7 and may be formed of several sections depending on the structure of the storage means 5. Branch 8 comprises a section 8b located between valve 7 and section 8a forming a third portion of the ring formed by branches 8 and 9. This section 8b may be associated thermally with the sanitary hot water stored in tank 3 by means of a pipe 12 external to tank 3 so as to form a heat exchanger 13. Section 8b can advantageously come in the shape of a coil.

A pipe 14 connected to branch 8 in parallel to its section 8b at junction points 34 and 35 allows the heat transfer water to be thermally associated with the heat diffusion system 1; this pipe 14 is so designed as to permit suitable installation of the floor panels 2. Branch 8 then consists of two sections 8c and 8d connecting junction point 35 and portion 8a and two sections 8e and 8f connecting junction point 34 to valve 19.

Branch 9 comprises two sections 9b and 9c which connect section 9a to outlet 6c of valve 6.

The heating installation shown in FIG. 1 comprises in addition an auxiliary heat source consisting of a heat pump marked overall by reference 15 and thermally associated with the return pipe 12a for the sanitary water going from heat exchanger 13 to tank 3.

The condenser 16 of the heat pump 15 is thermally associated with the return pipe 12a. The evaporator 17 of the heat pump 15 is thermally associated with a pipe 18 connected to the evaporator 17 and connected both to branch 8 between its sections 8c and 8d and also on the outlet 19b of a three-way valve 19 of the same type as valves 6 and 7; this valve 19 is also installed on branch 8 between valve 7 and its section 8b and more precisely between sections 8f and 8e so that its inlet 19c connected to section 8f is on the side of the 7c outlet of valve 7 and its other outlet 19a connected to section 8e is on the side of section 8b of branch 8.

In order to maximize the heat pump 15 efficiency, a by-pass direct return pipe 20 is provided on the portion of pipe 18 outside the evaporator 17 and this pipe 20 is connected to portion 18a connected between outlet 19b and the evaporator 17. Pipe 20 comprises a valve 21 which is controlled by the evaporator temperature in order to hold this temperature at a suitable value.

As can be seen in FIG. 1, the two branches of pipe 14 are connected by a pipe 22 mounted in parallel with the heat diffusion system 2. A three-way mixer valve 23 is installed at one of the connections between pipe 14 and pipe 22. It is thus possible to recirculate part of the water going through the radiators so as to only consume the amount of heat required.

In order to circulate the water in the various pipes there has been provided a pump 24 on branch 9 between valve 6 and its section 9a, and more precisely between sections 9c and 9b, a pump 25 on pipe 12 between tank 3 and the heat exchanger 13, a pump 26 on pipe 14 between the mixer valve 23 and the heat diffusion system 1 and a pump 27 on pipe 18a between the connection with pipe 20 and the evaporator 17.

We shall now describe the main modes of circulation of the heat transfer fluid and the heat exchanges possible on the basis of these circulation modes in the example shown in FIG. 1.

A first mode of circulation consists in circulating water in pipe 10 and the associated solar collectors 4 and in the ring formed by branches 8 and 9 avoiding section 8a of branch 8. For this purpose valve 6 is open between its inlet 6b and its outlet 6c, valve 7 is open between its inlet 7a and its outlet 7c, valve 19 is open between its inlet 19c and its outlet 19a and valve 23 is closed.

A second circulation mode consists in circulating water in pipe 11 and the storage means 5 associated with it and in the ring formed by branches 8 and 9 cutting out section 9a of branch 9. For this purpose valve 6 is open between its inlet 6a and its outlet 6c, valve 7 is open between its inlet 7b and its outlet 7c and valve 19 is open between its inlet 19c and its outlet 19a and valve 23 is closed. A third circulation mode consists in circulating the water in pipe 10 and the solar collectors associated with it, in pipe 11 and the storage means associated with it and in the ring formed by branches 8 and 9 cutting out section 8a of branch 8 and section 9a of branch 9. For this valve 6 is open between its inlet 6b and its outlet 6c, valve 7 is open between its inlet 7b and its outlet 7c, valve 19 is open between its inlet 19c and its outlet 19a and valve 23 is closed.

In these three cases pump 24 provides the water drive.

The third circulation mode indicated above is suitable for the direct transfer of heat from the solar collector 4 to the storage means 5. It will be noted that, in this case, section 8b of branch 8 is only used as a pipeline.

Using one of these first three circulation modes it is possible to heat the water in tank 3 and to use the heat diffusion system separately or together. It will be noted that in the third circulation mode it is possible at the same time to heat the storage means or to take heat from it depending on the required and possible heat exchanges.

Thus, in order to heat the water in tank 3, pump 25 is operated and this circulates the water contained in tank 3 through the heat exchanger 13; pipe 12a passing through the condenser 16 of the heat 15 is only used as a pipeline and not as a heat exchanger.

For heat generation using the heat diffuser system 1, pump 26 is operated and mixing valve 23 permits the appropriate circulation of heat transfer water in the heat diffusion system 1 with possible direct return via pipe 22.

A fourth circulation mode consists in circulating the heat transfer water through the collectors 4 and the evaporator 17. For this purpose valve 6 is open between its inlet 6b and its outlet 6c, valve 7 is open between its inlet 7a and its outlet 7c and valve 19 is open between its inlet 19c and its outlet 19b. The water then flows in pipe 10 and the collectors 4 associated with it, through pipe 18 associated with the evaporator 17 of the heat pump 15 and though the ring formed by branches 8 and 9, cutting out its section 8a and its section 8b.

A fifth circulation mode consists in circulating the heat transfer water through the storage means 5 and through the evaporator 17 of the heat pump 15. For this purpose valve 6 is open between its inlet 6a and its outlet 6c, valve 7 is open between its inlet 7b and its outlet 7c and valve 19 is open between its inlet 19c and its outlet 19b. The water then flows through pipe 11 and the storage means 5 associated with it, through pipe 18 associated with the evaporator 17 and through the ring formed by branches 8 and 9 cutting out section 9a of branch 9 and section 8b of branch 8.

A sixth circulation mode consists in circulating the heat transfer water through the solar collectors 4, the storage means 5 and the evaporator 17 of the heat pump 15. For this purpose valve 6 is open between its inlet 6b and its outlet 6c, valve 7 is open between its inlet 7b and its outlet 7c and valve 19 is open between its inlet 19c and its outlet 19b. The water then flows through pipe 10 and the solar collectors 4 associated with it, through pipe 11 and the storage means 5 associated with it, through pipe 18 associated with the evaporator 17 of the heat pump 15 and through the ring formed by branches 8 and 9 cutting out sections 8a and 8b of branch 8 and section 9a of branch 9.

In these last three circulation modes, the heat transfer water is driven by pump 24 and can additionally be driven by pump 27 which then sets up a direct return flow to the evaporator through pipe 20. Using these fourth, fifth and sixth circulation modes it is possible to raise the temperature of the sanitary water contained in tank 3 or to use the heat diffusion system 1 or both at the same time, by starting up the heat pump 15.

In fact, in order to heat up the water contained in tank 3 it is enough to operate pump 25 which then circulates water through the condenser 16 via pipe 12; in this case the heat exchanger 13 has no heat transfer function but is used only as a pipeline.

In order to generate heat in the heat diffusion system 1, it suffices to start up pump 26, along with the mixer valve 23. The water then flows through the loop formed by pipe 14 and section 8b of branch 8. By operating pump 25 it is possible to obtain an exchange of heat between the heat pump 15 condenser 16 and the heat diffusion system 1 by means of the heat exchanger 13 in which an exchange of heat is produced between the sanitary water contained in tank 3 and flowing in pipe 12 and the water flowing in section 8b of branch 8 associated in this case with the heat diffusion system 1.

It may also be noted that the sixth circulation mode as described above not only, as we have seen, enables the sanitary hot water in tank 3 to be heated and the heat diffusion system to be used or both at the same time, but it also enables the storage means 5 to be heated up if this is possible, or its heat to be restored.

Owing to the structure of the heating installation described above, the circulation modes and the possible heat exchanges just indicated cannot be considered to be restrictive. Other circulation modes and other heat exchanges can be envisaged, notably by combining the above circulation modes and heat exchanges.

When putting the heating installation that has just been described into practice an electric or electronic device will preferably be provided the appropriately controlling valves 6, 7, 19, 21, 23, pumps 24, 25, 26 and 27 and the heat pump 15, in accordance with the required fluid circulation modes. This electric or electronic installation control device may be made automatic, and it is then possible to choose the fluid circulation mode in accordance with the temperatures of the various installation elements and/or in accordance with the temperature differences existing between these elements, to achieve the possible and required heat transfers.

With this aim in view a temperature probe 28 may be provided for and installed on tank 3, with this temperature probe 28 allowing the installation to be controlled so as to raise the temperature of the water contained in tank 3 between two relatively widely spaced thresholds.

A temperature probe 29 can also be provided in the storage means 5 and a temperature probe 30 provided in the heat source, which here consists of solar collectors 4, and the temperature difference between the storage means 5 and the solar collectors 4 measured to find out whether transfer of heat is possible from the solar collectors 4 to the storage means 5.

A temperature probe 31 can also be installed on branch 8 upstream of its section 8a and the difference measured between the temperature supplied by this probe 31 and the temperature supplied by probe 30 to find out whether the solar collectors 4 can supply heat to the installation.

In addition a temperature probe 32 can be provided located on branch 8 of outlet 7c of valve 7 and a temperature probe 33 provided located on pipe 14 at the inlet to the heat diffusion system 1; the difference between the temperatures measured by these probes 32 and 33 enables the heat pump 15 and pump 27 to be operated if necessary.

The control device can have other temperatures submitted to it like, for example, the outside temperature.

Figure 2:
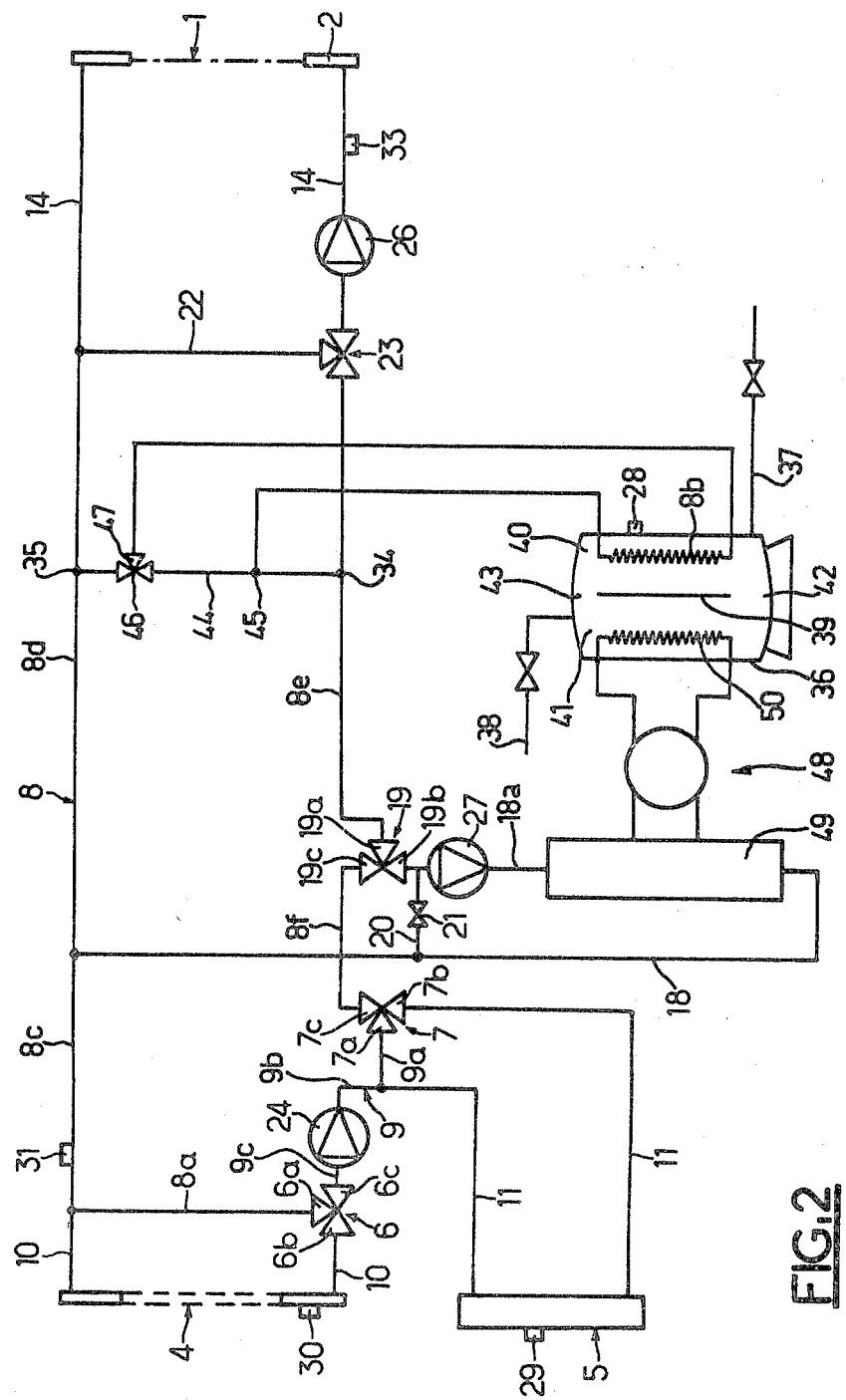

We shall now describe the heating installation shown in FIG. 2.

This heating installation has a large part of its structure similar to the heating installation shown in FIG. 1. This is why the same references have been kept for the elements and sections common to both these installations.

Thus, it can be seen that the installation shown in FIG. 2 comprises a ring formed by branches 8 and 9. This ring comprises a portion 8a across the ends of which a by-pass pipe 10 thermally associated with the solar collectors 4 is connected, a portion 9a downstream of the said portion 8a, across the ends of which a by-pass pipe 11 thermally associated with the storage means 5 is connected, a portion 8b placed between portions 8a and 9a downstream of portion 9a and a pipe 14 associated thermally with the heat diffusion system 1 and connected across portion 8b on branch 8 of the ring at the points labelled 34 and 35 in such a way that point 35 is on the side of portion 8a.

As in the preceding version a three-way valve 6 is provided at one of the ends of portion 8a, a three-way valve 7 at one of the ends of portion 9a, a direct return pipe 22 mounted in parallel with the heat diffusion system 1 and a mixing valve 23 at one of the ends of this pipe 22, as well as a pump 24 mounted on branch 9 between valve 6 and portion 9a and a pump 26 mounted on pipe 14 between valve 23 and the heat diffusion system 1.

The heating installation shown in FIG. 2 also comprises a sanitary water tank 36 comprising a sanitary water feed pipe 37 at the bottom and a sanitary water delivery pipe 38 at the top.

Tank 36 comprises an internal partition 39 placed vertically and bounding two compartments 40 and 41 inside this tank 36. In the example shown compartments 40 and 41 can connect at the bottom via a passageway 42 and at the top via a passageway 43.

Portion 8b of the aforesaid ring comes in the form of a coil which is located inside compartment 40 of tank 36 so that the heat transfer water of portion 8b is thermally associated with the sanitary water contained in tank 36. A by-pass pipe 44 is connected on section 8 of the said ring in parallel with portion 8b at junction points 45 and 46 with junction point 45 being between junction point 34 and ring portion 8b whilst junction point 46 is between junction point 35 and portion 8b. A three-way valve 47 is fitted at junction point 46 and this enables the heat transfer water to be circulated either through portion 8b or through by-pass pipe 44, in which case junction points 34 and 45 may coincide.

In a similar way to the preceding example, but partly installed in a different manner, the heating installation shown in FIG. 2 also comprises a heat pump marked overall by the reference 48.

The heat pump 48 comprises an evaporator 49 which is thermally associated, in the same way as in the example shown in FIG. 1, with a pipe 18, 18a, pipe 18 being connected to branch 8 between junction point 35 and portion 8a whilst pipe 18a is connected on branch 8 between junction point 34 and portion 9a. A direct return pipe 20 is also provided for and a valve 21 which can be controlled by the evaporator temperature so as to hold this temperature at a suitable value and is installed on this pipe along with a pump 27 providing water circulation through pipe 18, 18a and through pipe 20. A three-way valve 19 is also provided at the junction between pipe 18a and ring branch 8.

The heat pump 48 also comprises a condenser 50 having the form of a coil which is placed in compartment 41 of tank 36 so as to be thermally associated with the sanitary water contained in the tank.

To avoid repetition we shall describe below the operation of the heating installation shown in FIG. 2 referring to the heat transfer water circulation modes and to the heat exchanges possible from these circulation modes described in connection with the heating installation shown in FIG. 1 and which are not restrictive; it will be noted that valve 47 and by-pass pipe 44 of the installation shown in FIG. 2 carry out the functions performed by pipe 12 and pump 25 in the heating installation shown in FIG. 1.

In order to obtain the first, the second and the third circulation modes of the preceding example, it suffices to adjust the valves 6, 7 and 19 as above and to set valve 47 so that the heat transfer water flows through the by-pass pipe 44 and not through portion 8b.

In the same way as before, the third circulation mode is suited for direct heat transfer from the solar collector 4 to the storage means 5 by operation of pump 24.

Starting with one of these first three circulation modes it is possible, as before, to heat the water in tank 36 and to use the heat diffusion system 1, separately or together.

Thus, in order to heat the water in tank 36 valve 47 has only to be operated so that, thanks to pump 24, the heat transfer water flows in portion 8b placed in compartment 40 of tank 36 and not in the by-pass pipe 44, and for heat generation by means of the heat diffusion system 1, pump 26 and mixing valve 23 are operated as before.

The fourth, fifth and sixth circulation modes of the preceding example can be applied directly to the heating installation shown in FIG. 2 by setting valves 6, 7 and 19 as before and by operating pump 24. However, it will be noted that in these circulation modes both portion 8b of branch 8 and the by-pass pipe 44 are cut out.

These fourth, fifth and sixth circulation modes can also be used as previously to raise the temperature of the sanitary water contained in the tank 36 or they allow the heat diffusion system 1 to be used, or both these at once, by putting the heat pump 48 into operation. Thus, the sanitary water in contained in tank 36 can be heated by simply operating the heat pump 48 owing to the fact that its evaporator 50 is placed in compartment 41 of tank 36.

For heat production in the heat diffusion system 1, in this example, valve 47 has only to be set so that the heat transfer water can flow through portion 8b and not through the by-pass pipe 44 and pump 26 and mixing valve 23 operated along with the heat pump 48; the heat transfer water then flows in a second circuit passing through the heat diffusion circuit 1 and portion 8b. Thus the heat exchange between the condenser 50 of the heat pump 48 and portion 8b can be performed via the sanitary water contained in tank 36; this water is simply moved inside the tank 36 by thermosiphon, flowing from one compartment to the other via the bottom passageway 42 and the top passageway 43.

It will be noted that, in the same way as in the preceding example shown in FIG. 1, the storage means 5 can be heated up, if this is possible, or else its heat can be recovered.

As in the preceding example, the possible circulation modes and heat exchanges which have just been described in connection with FIG. 2 cannot be considered as restrictive; other circulation modes and other heat exchanges can be envisaged by combining the above circulation modes and heat exchanges.

For practical application of the heating installation shown in FIG. 2 it is preferable to provide for an electrical or electronic device for the appropriate control of valves 6, 7, 19, 21, 23 and 47, pumps 24, 26 and 27 and of the heat pump 48, in accordance with the required and possible heat transfer water circulation modes. This electrical or electronic heating installation control device may be made automatic and select the heat transfer water circulation mode in accordance with the temperature of the various installation elements and/or in accordance with the temperature differences existing between these elements with the aim of achieving the possible and desired heat transfers.

With this aim in view the heating installation shown in FIG. 2, like the heating installation shown in FIG. 1, is provided with a temperature probe 28 in the sanitary hot water tank 36, a temperature probe 29 in the storage means 5, a temperature probe 30 in the heat source 4, a temperature probe 31 indicating the temperature of the heat transfer water in section 8c just upstream of ring portion 8a and a temperature probe 33 located in pipe 14 at the inlet to the heat diffuser system 1. The electrical or electronic control device could also have other temperatures submitted to it if this turned out to be necessary.

This invention is obviously not restricted to the two examples described above. In fact their structure can be altered by, for example, changing the position of the various valves or the position of the pumps without, however, changing their operation. It is also possible to provide, in the example shown in FIG. 2, for a sanitary hot water tank having a distinctly different construction whilst still allowing the exchange of heat between the evaporator 50 of the heat pump 48 and portion 8b with the heat transfer water passing through it. It is also possible to replace the heat pumps 15 and 48 by, for example, a boiler or a heating element of a conventional type. Many other embodiments are possible whilst still remaining within the framework of the present invention.

I claim:

1. A heating installation for space heating and for the production of sanitary hot water comprising
    a heat source,
    a means for storing heat,
    a heat diffusion system,
    a tank for sanitary water,
    a selectively operable auxiliary heat source thermally associated with said sanitary water and
    a pipe forming a loop in which a fluid may flow in one direction, said loop comprising
        a first portion across the ends of which a first by-pass is connected for permitting said fluid to be thermally associated with said heat source including means for selectively circulating said fluid either in said first portion or in said first bypass,
        a second portion located in the direction of flow of the fluid in said loop downstream of said first portion and across the ends of which a second bypass is connected for permitting the fluid to be thermally associated with said means for storing heat including means for selectively circulating said fluid either in said second portion or in said second bypass,
        a third portion located between said first and second portions downstream of said second portion and thermally associated with the sanitary water of said sanitary water tank for exchanging heat between the fluid circulating in said third portion and the sanitary water,
        a third bypass connected across the ends of said third portion and thermally associated with said heat diffusion system,
    whereby heat transfers may selectively be performed:
        a. with the fluid circulating in said third portion from said heat source or said storage means to the sanitary water in said sanitary water tank,
        b. with the fluid from said heat source or said storage means to said heat diffusion system, or
        d. with the fluid circulating in said third portion from the sanitary water in said sanitary water tank as heated by said auxiliary heat source to said heat diffusion system,
    according to demand and as conditions permit.

2. The installation as claimed in claim 1 further comprising
    a sanitary water circulation circuit external to said sanitary water tank that together with said third portion comprise a heat exchanger whereby heat transfers are permitted between the fluid and the sanitary water when the fluid flows through said third portion and the sanitary water flows through said circulation circuit.

3. The installation as claimed in claim 1 wherein said third portion is located in said sanitary water tank to permit heat transfer between fluid and sanitary water in said tank, and further comprising a shunt across the ends of said third portion including means for selectively circulating the fluid in said third portion or said shunt.

4. The installation as claimed in claim 1 further comprising
 a first temperature probe for measuring the temperature of said heat source,
 a second temperature probe for measuring the temperature of said means for storing heat,
 a third temperature probe for measuring the temperature of the fluid in said loop just upstream of said first portion,
 a fourth temperature probe for measuring the temperature of the fluid at the inlet to said heat diffusion system and
 a fifth temperature probe for measuring the temperature of the sanitary water in said sanitary water tank,
 in order to enable control of elements of the installation so as to carry out the desired possible heat transfers.

5. A heating installation for space heating and for the production of sanitary hot water comprising:
 a heat source,
 a heat diffusion system,
 a means for storing heat,
 a heat pump having a condenser and an evaporator, the condenser associated thermally with the sanitary water in said tank,
 a pipe forming a loop in which a fluid may flow in one direction, said loop comprising
 a first portion across the ends of which a first bypass is connected for permitting the fluid to be thermally associated with said heat source including means for selectively circulating the fluid either in said first portion or in said first bypass,
 a second portion located in the direction of flow of the fluid in said loop downstream of said first portion and across the ends of which a second bypass is connected for permitting the fluid to be thermally associated with said storage means including means for selectively circulating the fluid either in said second portion or in said second bypass,
 a third portion located between said first and second portions downstream of said second portion and thermally associated with the sanitary water of said tank for exchanging heat between the fluid circulating in said third portion and the sanitary water, a third bypass connected across the ends of said third portion and thermally associated with said heat diffusion system,
 the evaporator of said heat pump being associated thermally with the fluid in the loop via a fourth bypass connected across the ends of said third portion and said third bypass, including means for selectively circulating the fluid either in said fourth bypass or in said third portion,
 whereby heat transfers may selectively be performed:
  a. with the fluid circulating in the third portion from said heat source or said storage means to the sanitary water in said sanitary water tank,
  b. with the fluid from said heat source or said storage means to said heat diffusion system,
  c. through said heat pump from said heat source or said storage means to the sanitary water in said sanitary water tank, or
  d. through said heat pump and said sanitary water from said heat source or said storage means to said heat diffusion system,
  according to demand and as conditions permit.

6. The installation as claimed in claim 5 further comprising
 a sanitary water circulation circuit external to said sanitary water tank that together with said third portion comprise a heat exchanger whereby heat transfers are permitted between the fluid and the sanitary water when the fluid flows through said third portion and the sanitary water flows through said circulation circuit.

7. The installation as claimed in claim 6 wherein said third portion is located in said sanitary water tank to permit heat transfer between fluid in said third portion and sanitary water in said tank, and further comprising a shunt across the ends of said third portion including means for selectively circulating the fluid either in said third portion or said shunt.

8. The installation as claimed in claim 5 wherein said condenser of said heat pump is located in said tank.

9. The installation as claimed in claim 7 wherein said sanitary water tank has two compartments partially separated by a partition, one of said compartments houses said condenser, the other said compartment houses said third portion, and said partition permits communication of water between said compartments.

10. The installation as claimed in claim 9 wherein said compartments are connected at the top and at the bottom.

11. The installation as claimed in claim 5 wherein the fourth bypass includes means for thermal association with said evaporator, said means has an inlet and an outlet, said inlet and outlet are provided with a direct return pipe therebetween having a valve controllable to maintain said evaporator at a suitable temperature, and a pump for forcing the fluid therethrough.

12. The installation as claimed in claim 5 further comprising
 a first temperature probe for measuring the temperature of said heat source,
 a second temperature probe for measuring the temperature of said means for storing heat,
 a third temperature probe for measuring the temperature of the fluid in said loop just upstream of said first portion,
 a fourth temperature probe for measuring the temperature of the fluid at the inlet to said heat diffusion system and
 a fifth temperature probe for measuring the temperature of the sanitary water in said sanitary water tank,
 in order to enable control of elements of the installation so as to carry out the desired possible heat transfers.

13. The installation as claimed in either of claims 1 or 5 wherein said heat source is a solar collector.

14. The installation as claimed in either of claims 2 or 6 wherein a pump is provided in said circulation circuit.

15. A heating installation for space heating and for the production of sanitary hot water comprising:
- a heat source including a solar collector,
- a heat diffusion system,
- a means for storing heat,
- a sanitary water tank having two compartments that are partially separated by a partition but that are in communication with each other at their tops and at their bottoms,
- a heat pump having a condenser and an evaporator the condenser of which is located within one compartment of said sanitary water tank,
- a pipe forming a loop in which a fluid may flow in one direction, said loop comprising
- a first portion across the ends of which a first bypass is connected for permitting the fluid to be thermally associated with said heat source including means for selectively circulating the fluid either in said first portion or in said first bypass,
- a second portion located in the direction of flow of the fluid in said loop downstream of said first portion and across the ends of which a second bypass is connected for permitting the fluid to be thermally associated with said storage means including means for selectively circulating the fluid either in said second portion or in said second bypass,
- a third portion between said first and second portions downstream of said second portion located in the other compartment of said sanitary water tank to permit heat transfer between fluid in said third portion and the sanitary water in said tank, a shunt across the ends of said third portion including means for selectively circulating the fluid either in said third portion or said shunt, a third bypass connected across the ends of said third portion and thermally associated with said heat diffusion system,
- the evaporator of said heat pump being associated thermally with the fluid via a fourth bypass connected across the ends of said third portion and said third bypass including means for selectively circulating the fluid either in said fourth bypass or in said third portion,
- said fourth bypass including means for thermal association with said evaporator, said means for thermal association having an inlet and an outlet, said inlet and outlet provided with a direct return pipe therebetween, said direct return pipe having a valve controllable to maintain said evaporator at a suitable temperature, and a pump in the inlet between the direct return pipe and the means for thermal association for forcing the fluid therethrough,
- a first temperature probe for measuring the temperature of said heat source,
- a second temperature probe for measuring the temperature of said means for storing heat,
- a third temperature probe for measuring the temperature of the fluid in said loop just upstream of said first portion,
- a fourth temperature probe for measuring the temperature of the fluid at the inlet to said heat diffusion system and
- a fifth temperature probe for measuring the temperature of the sanitary water in said sanitary water tank, whereby heat transfers may selectively be performed:
  a. with the fluid circulating in the third portion from said heat source or said storage means to the sanitary water in said sanitary water tank
  b. with the fluid from said heat source or said storage means to said heat diffusion means,
  c. through said heat pump from said heat source or said storage means to the sanitary water in said sanitary water tank, or
  d. through said heat pump and said sanitary water from said heat source or said storage means to said heat diffusion system,
  according to demand and as conditions permit.

* * * * *